Feb. 28, 1967 O. M. STOLZ Re. 26,165

BUILDING WALL STRUCTURE

Original Filed Nov. 2, 1960 2 Sheets-Sheet 1

INVENTOR.
OWEN M. STOLZ

BY Dybvig and Dybvig
HIS ATTORNEYS

BUILDING WALL STRUCTURE

Original Filed Nov. 2, 1960 2 Sheets-Sheet 2

INVENTOR.
OWEN M. STOLZ
BY Dybvig and Dybvig
HIS ATTORNEYS

United States Patent Office

Re. 26,165
Reissued Feb. 28, 1967

26,165
BUILDING WALL STRUCTURE

Owen M. Stolz, 825 W. Centerville Road,
Dayton, Ohio 45459

Original No. 3,221,451, dated Dec. 7, 1965, Ser. No. 108,965, Nov. 2, 1960. Application for reissue Mar. 31, 1966, Ser. No. 541,057
4 Claims. (Cl. 52—80)

Matter enclosed in heavy brackets [ ] appears in the original patent but forms no part of this reissue specification; matter printed in italics indicates the additions made by reissue.

The present application is a continuation-in-part of my abandoned application, Serial No. 623,053, filed November 19, 1956, for Building and Closure Therefor.

This invention relates to a wall structure and more particularly to a sheet metal wall structure enabling frameless and trussless building constructions; however, the invention is not necessarily so limited.

An object of this invention is to provide an improved wall structure comprising individual preformed panels which are self-reinforcing such that no frame or trusses are required in the structure.

Another object of this invention is to provide a spherical wall structure assembled with individual preformed panels.

Still another object of this invention is to provide improved self-reinforcing panels for use in constructing frameless and trussless dome-shaped or otherwise curved building structures.

Other objects and advantages reside in the construction of parts, the combination thereof, the method of manufacture and the mode of operation, as will become more apparent from the following description.

Figure 1:
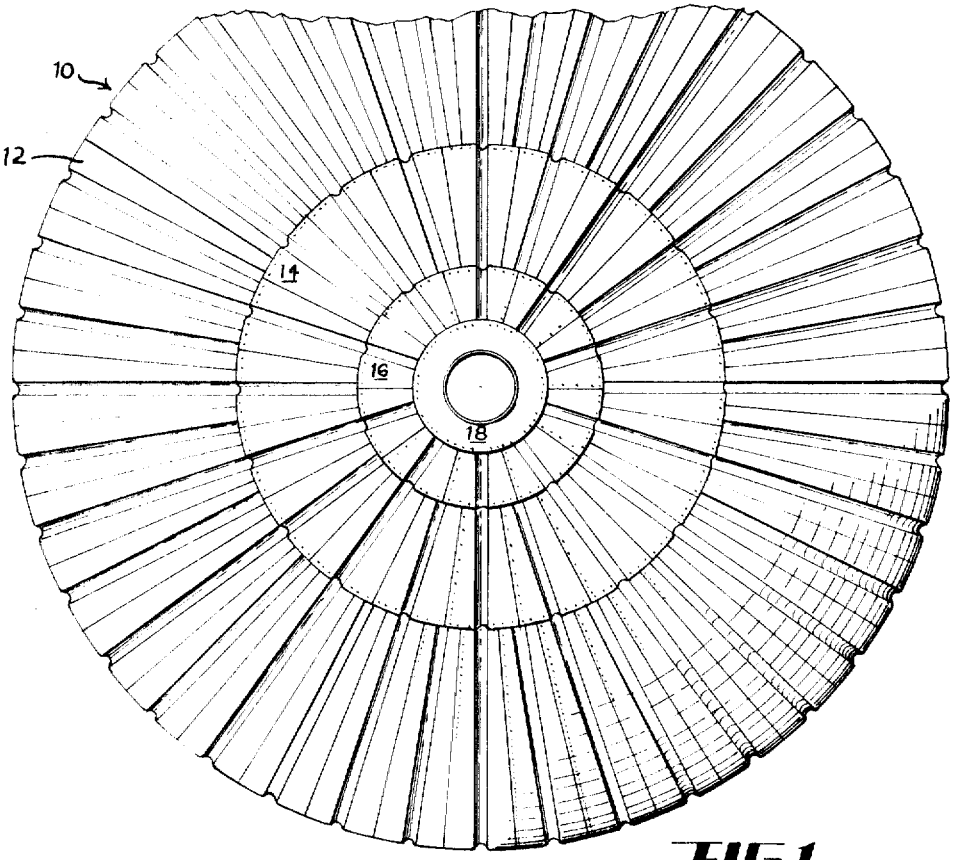
FIGURE 1 is a plan view with a portion broken away, illustrating a hemispherical or dome-shaped building embodying the present invention.
Figure 2:
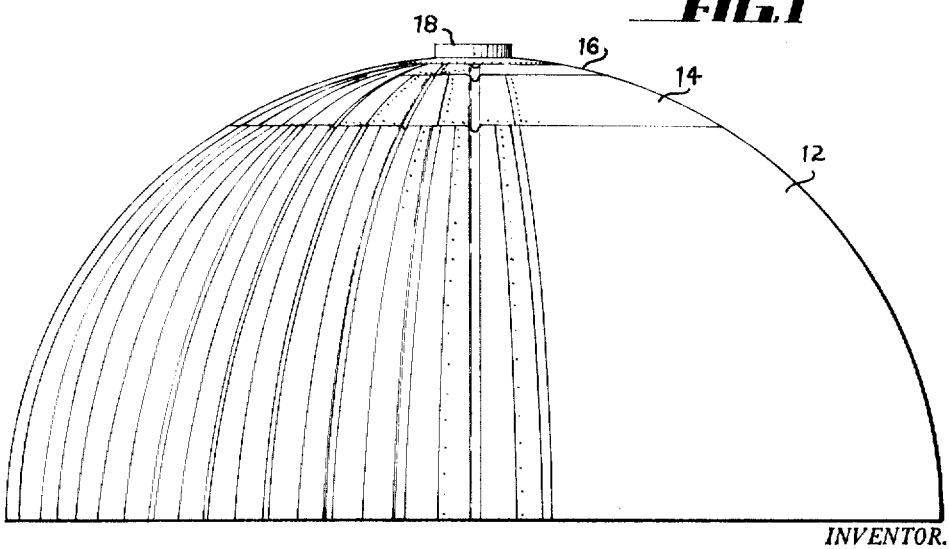
FIGURE 2 is a side elevation view illustrating the general contour of the building. In order to avoid unnecessary duplication of detail, this view is only partially completed.

Referring to the drawings in detail, FIGURES 1 and 2 illustrate a generally hemispherical building which is formed of three separately identifiable annular tiers 12, 14 and 16. In FIGURE 1, it will be noted that the first tier 12 extends appreciably more than halfway up the building, the tiers 14 and 16 becoming successively smaller as they approach the top of the building. For purposes of illustration only, the tier 16 is shown to meet a collar 18 at the top of the building. Depending upon the use to which the building is put, this collar 18 may support a ventilating cover, not shown. However, it is to be understood that other suitable closures may be substituted for the collar 18. The particular details of the illustrated or other closure form no part of this invention.

Figure 3:
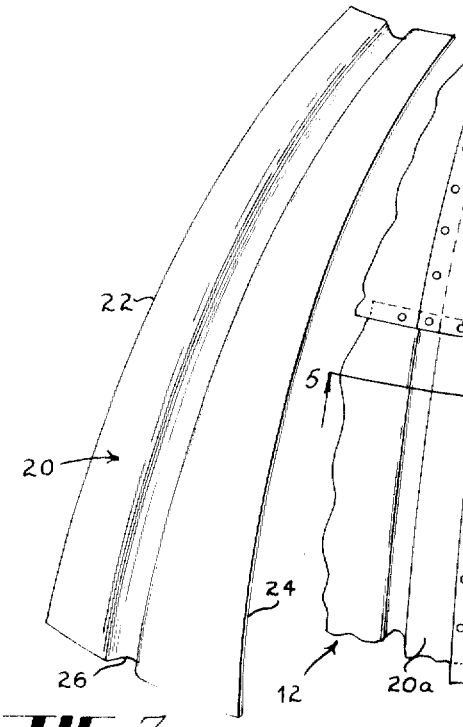
FIGURE 3 is a perspective view illustrating the shape of panels employed in the construction of the present building.

The building of FIGURES 1 and 2 is assembled with panels 20 as illustrated schematically at FIGURE 3. There it will be noted that the panels, which are preferably sheet metal, have tapered side margins 22 and 24 and are provided with a central reinforcing groove 26 running from the bottom to the top of the panel. As will be obvious to those skilled in the art, the particular cross sectional shape of the groove 26 is subject to variation depending upon the amount of reinforcement needed in the building structure. Thus, in the fabrication of very large buildings, groove 26 must be made large and deep. As the overall size of the building decreases, the depth of the groove can be decreased accordingly.

Figure 4:
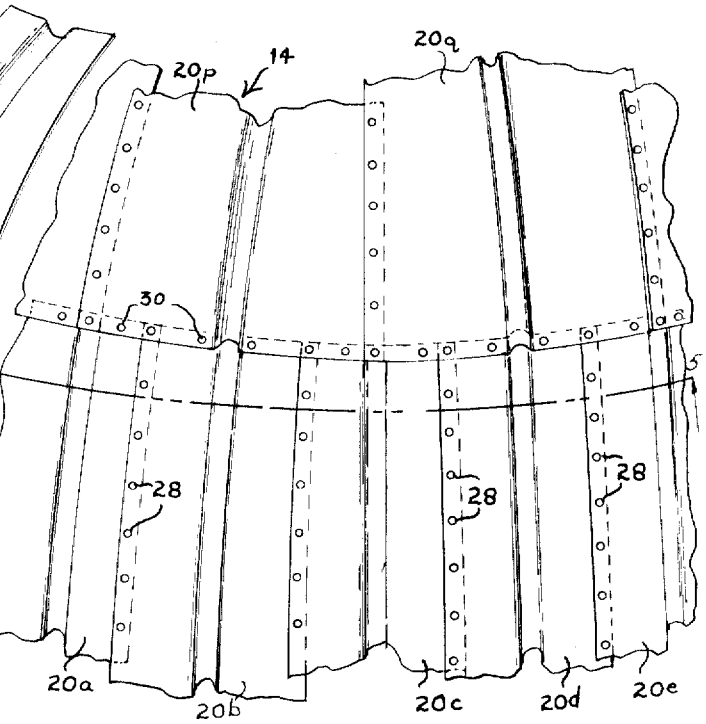
FIGURE 4 is an enlarged fragmentary plan view illustrating the assembly of panels in the present invention.

FIGURE 4 illustrates the assembly of panels 20 in the adjoining tiers 12 and 14 of the building structure disclosed in FIGURES 1 and 2. The portion of the lower tier 12, which is visible in FIGURE 4, comprises adjacent overlapping panels 20a, 20b, 20c, 20d, and 20e. Where they overlap, these panels are joined by spaced rivets 28. These panels are tapered so as to have a base width which is substantially twice the width of the top. More specifically, the dimensions of these panels are such that the center to center distance between rivets 28 on opposite margins of each panel at the base of the tier 12 is exactly twice the center to center distance between corresponding rivets at the top of the tier 12.

As one example, the width between the margins 22 and 24 at the base of each of the panels in the tier 12 may be 2.1 feet while the width of the margins at the top of the panels in the tier 12 may be 1.05 feet. Allowing an overlap of $\frac{1}{10}$ of an inch between adjacent panels at the base of the tier and $\frac{1}{20}$ of an inch between adjacent panels at the top of the tier the center to center distance between rivets at the base of the tier will be 2 feet and the center to center distance between rivets at the top of the tier will be 1 foot. There has been no attempt to adhere precisely to these relative dimensions in the drawings.

A portion of the upper tier 14, which is visible in FIGURE 4, includes panels 20p and 20q assembled in adjacent overlapping relation. These panels have the same base width as the panels in the lower tier 12 and accordingly have a base width which is substantially twice the top widths of the panels in the tier 12. Thus, the center to center distance between the rivets securing the side margins of the panels 20p and 20q is exactly twice the center to center distance between the rivets securing the overlapping side margins of the tops of the panels in the tier 12. As illustrated in FIGURE 4, the central reinforcing grooves in the panels 20p and 20q nest into alternate reinforcing grooves in the panels of the tier 12. In accordance with this scheme, every other reinforcing groove in the tier 12 terminates at the base of the tier 14 and the remaining reinforcing grooves in the tier 12 extend on through the tier 14. Aligned with each terminating groove in the tier 12 is an overlapping seam in the tier 14.

Figure 5:
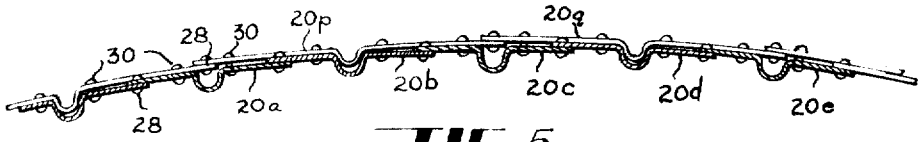
FIGURE 5 is a fragmentary section view taken substantially along the line 5—5 of FIGURE 4.

As is apparent in FIGURE 4, the cross sectional area of the reinforcing grooves in the tier 14 is the same as the cross sectional area of the reinforcing grooves in the tier 12. With this construction, of course, it is not possible for the grooves in the tier 14 to nest precisely within the grooves of the tier 12. Rather, the grooves must be forced one into the other, reliance being placed on the yielding characteristic of the sheet metal panels for a snug interfit between the grooves in the two tiers. As illustrated, rivets 30 are employed to join the tier 14 to the tier 12, these rivets functioning to draw the nested grooves into interfitting relationship. The manner in which the panels of the two tiers nest together is illustrated in FIGURE 5.

While FIGURE 4 has been described with reference specifically to the tiers 12 and 14, it will be understood that the tiers 14 and 16 meet in an identical manner. In other words, FIGURE 4 would be equally accurate if described with reference to the tiers 14 and 16.

As is apparent in FIGURES 1 and 2, the elevational length of the panels of the tier 12 considerably exceeds the elevational length of the panels in the tier 14. The elevational length of these panels is determined by the desired geometrical shape of the structure. Thus, where the panel widths taper at the top to one half of the base widths, the circumference at the top of each tier will be one half the circumference at the base of each tier. Accordingly, the elevational lengths of the various tiers in the building structure will be determined by the elevations along the desired structure at which the circumference of the structure is to be one half, one fourth, one eighth, etc. of the base dimension. In large building structures, the elevation of any given tier may require panels which are too long for convenient handling. In such event, it is deemed within the purview of the present invention to construct the panels from multiple pieces riveted together at the building site. It will be understood by those skilled in the art that the application of the present construction is not limited to spherically shaped building structures. Thus, the structure may have an ovate or elliptical configuration rather than a spherical configuration. Furthermore, the construction disclosed may be used on only fragmentary parts of an entire building structure, an example being spherically curved end closures secured to a generally semicylindrical building.

With reference again to FIGURES 1 and 2, it will be noted that a portion of the reinforcing grooves in the panels of this building structure are effectively continuous from the bottom to the top of the structure. Others terminate at the upper margin of the tier 12 and still others terminate at the upper margin of the tier 14. Thus, with this construction, the building is supported by continuous reinforcing grooves some of which extend entirely from the bottom to the top of the structure with undiminished cross sectional shape. Those grooves which extend continuously from bottom to top provide the principal support of the building structure in that they convey loads to which the building is subjected directly to the base of the structure. By virtue of this reinforcement, the need for a supplemental frame or trusses is entirely eliminated. With this type of construction, it is possible to erect hemispherical building structures having a base diameter exceeding thirty feet.

It will also be noted that the vertical seams formed by the overlap between the panels are discontinuous. Thus, the vertical seams in the tier 12 terminate at the base of the panels in the tier 14. Similarly, the vertical seams in the tier 14 terminate at the base of the panels in the tier 16. By staggering the locations of the vertical seam or overlap so that they are discontinuous across tiers, unusually long seams are avoided. The rigidity of the resulting structure, accordingly, is greater than would be the case, if the seams were continuous across the tiers.

The individual panels 20 used in this building wall structure may be made as follows. Starting with a plane rectangular sheet metal or similar material, the reinforcing groove 26 is rolled into the sheet and the edges trimmed to provide the desired taper. Thereafter, the grooved and tapered panel may be passed through a suitable three roll curving die to curve the panel to the desired radius of curvature. Rivet holes can be placed at preselected locations as desired.

Figure 6:
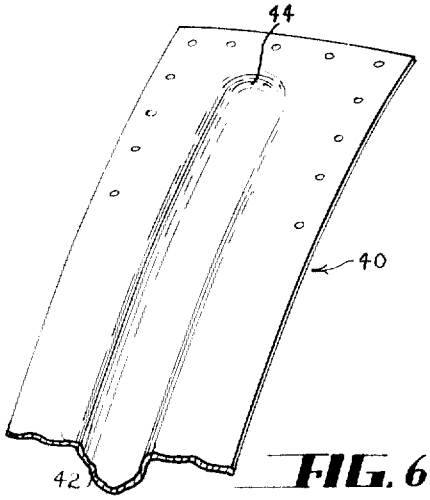
FIGURE 6 is a perspective view illustrating a modified panel design useful in the present invention.

FIGURE 6 illustrates a modified panel 40 which may be used in the present building construction at alternate panel sites in each of the tiers. It has already been emphasized that alternate grooves in each of the lower tiers terminate at the top thereof. If the building structure is to be weather-tight, it is necessary to enclose the ends of those grooves that terminate. Such closure may be effected with a mastic, for example, or a suitably designed cap which fits over the end of the groove 26 in the panel 20.

The design of the modified panel 40 is such that the need for a closure at the ends of the terminating grooves is eliminated. The modified panel 40 is substantially the same in general configuration as the panel 20. Thus, the panel 40 is provided with a longitudinal reinforcing groove 42 similar to the grooves 26 described above.

However, at the top of the panel, the end of the groove 42 has been flattened and rounded off as shown at 44 in a suitable press. Accordingly, the groove 42 terminates within the panel 40 and no end closure is required. As one example, the panel 40 could be substituted for the panel 20a in FIGURE 4, whereupon the upper end of the panel 40 would underlie the lower margin of the tier 14 leaving no air gap between the two tiers.

In the building structure shown and described, all of the panels of each tier have equal lengths. It should be understood, however, that this is not an essential feature of the building construction. In other words, alternate panels in each tier could have one length while the remaining panels in the same tier could be somewhat shorter or longer. With this scheme, the adjacent panels in the next adjacent tier would also have differing lengths. When this construction is used, the horizontal seams formed at the overlap between adjacent tiers would be discontinuous. Such discontinuity would result in a building of enhanced structural rigidity.

The present building structure has been described without reference to the location of doors and windows, the provision of doors and windows where desired being a common practice involving practices well-known and understood by those skilled in the art.

From the foregoing description, it will be seen that the present invention provides an economical wall construction for buildings which may be utilized for warehouses, garages, hangars, machine shops, and the like, the buildings being constructed without frames or trusses from preformed sheet metal panels. It will also be understood that the present building construction may be used to erect buildings having a wide variety of sizes and shapes without departing from the scope of the present invention.

Although the presently preferred embodiments of the device have been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a generally spherically shaped wall structure, a plurality of arched [sheet metal] panels *of sheet material* secured together in tiers, adjacent panels in a tier overlapping and adjacent tiers overlapping, the panels of each tier comprising fragments of a generally spherical surface and tapering from a wide base at one margin of the tier to a narrower top at the opposite margin of the tier, the width of the bases of the panels in one tier being substantially an even numbered integral multiple of the width of the tops of the panels in the adjacent tier which is disposed in overlapping relation to such bases, each panel having a central reinforcing groove formed integrally therewith and extending from its base to its top, grooves in the panels in one tier nesting with grooves in the panels of the adjacent tier, the construction and arrangement being such that the portions of overlap between adjacent panels of one tier will be staggered relative to the portions of overlap between adjacent panels of the adjacent tier.

2. In a generally spherically shaped wall structure, a plurality of arched [sheet metal] panels *of sheet material* secured together in horizontal tiers, adjacent panels in a tier overlapping and adjacent tiers overlapping, the panels of each tier comprising fragments of a generally spherical surface tapering from a wide base at one horizontal margin of the tier to a narrower top at the opposite horizontal margin of the tier, the width of the bases of the panels in one tier being substantially twice the width of the tops of the panels in the adjacent tier which is disposed in overlapping relation to such bases, each panel having a central vertically extending reinforcing groove formed integrally therewith and extending from its base to its top, said grooves projecting inwardly from the concave surface of the panel, the grooves in the panels of one tier nesting with grooves in the panels of the adjacent tier.

3. In a wall structure, a plurality of [sheet metal] panels *of sheet material* secured together in tiers, adjacent panels in a tier overlapping and adjacent tiers overlapping, each panel having a central reinforcing groove formed integrally therewith and extending transversely of said tiers, grooves in the panels of one tier nesting with grooves in the panels of the adjacent tier, the width of the panels in one tier being substantially an even numbered integral multiple of the width of the panels in the adjacent tier at the point of overlap therebetween, some at least of the reinforcing grooves being continuous across tiers while all of the portions of the overlap between adjacent panels in the tiers are staggered across tiers.

4. The assembly of claim 3, wherein said even numbered integral multiple is the multiple 2, the reinforcing grooves which are continuous across tiers occupying alternate panels in said adjacent tier, the reinforcing grooves in the remaining panels of said adjacent tier terminating within said remaining panels adjacent said one tier.

References Cited by the Examiner

The following references, cited by the Examiner, are of record in the patented file of this patent or the original patent.

UNITED STATES PATENTS

| | | | |
|---|---|---|---|
| 502,552 | 8/1893 | Detombay | 52—531 |
| 1,621,984 | 3/1927 | Horton | 220—1 |
| 1,907,268 | 5/1933 | Schwemlein | 220—5 |
| 2,071,093 | 2/1937 | Van Horn | 52—81 |
| 2,582,723 | 1/1952 | Stemmons et al. | 52—81 |
| 2,768,432 | 10/1956 | Hines | 220—1 |
| 3,085,366 | 4/1963 | Jamison | 52—81 |

FOREIGN PATENTS

| | | |
|---|---|---|
| 533,141 | 3/1956 | Canada. |
| 21,510 | 3/1883 | Germany. |
| 27,793 | 6/1884 | Germany. |

RICHARD W. COOKE, JR., *Primary Examiner.*